(12) United States Patent
Alter et al.

(10) Patent No.: US 7,352,292 B2
(45) Date of Patent: Apr. 1, 2008

(54) REAL-TIME, THREE-DIMENSIONAL SYNTHETIC VISION DISPLAY OF SENSOR-VALIDATED TERRAIN DATA

(76) Inventors: Keith Alter, 1130 Ridgewood Pl., Issaquah, WA (US) 98027; Andrew Kevin Barrows, 622 Portsmouth La., Foster City, CA (US) 94404; Chad Jennings, 2343 Clipper St., San Mateo, CA (US) 94403; Carlo Tiana, 1314 SE. 55th Ave., Portland, OR (US) 97215

( * ) Notice: Subject to any disclaimer, the term of this patent is extended or adjusted under 35 U.S.C. 154(b) by 195 days.

(21) Appl. No.: 11/336,519

(22) Filed: Jan. 20, 2006

(65) Prior Publication Data
US 2007/0171094 A1 Jul. 26, 2007

(51) Int. Cl.
*G08B 21/00* (2006.01)

(52) U.S. Cl. ........... 340/945; 340/995.1; 701/301

(58) Field of Classification Search ........... 340/945, 340/980, 990, 995.1; 701/301, 208
See application file for complete search history.

(56) References Cited

U.S. PATENT DOCUMENTS

| | | | | |
|---|---|---|---|---|
| 5,355,442 A | * | 10/1994 | Paglieroni et al. | 345/427 |
| 5,638,282 A | * | 6/1997 | Chazelle et al. | 701/301 |
| 6,985,091 B2 | * | 1/2006 | Price | 340/975 |
| 7,120,540 B2 | * | 10/2006 | Meunier | 701/301 |
| 2002/0069019 A1 | * | 6/2002 | Lin | 701/301 |

OTHER PUBLICATIONS

M. Uijt De Haag et al., Terrain Database Integrity Monitoring for Synthetic Vision Systems, IEEE Trans. on Aerospace and Electronic Systems, v. 41, p. 386-406, Apr. 2005.

A. Vadlamani et al., "Improved Downward-Looking Terrain Database Integrity Monitor and Terrain Navigation," Proc. IEEE Aerospace Conf., p. 1594-1607, Mar. 2004.

A. Vadlamani et al., "A 3-D Spatial Integrity Monitor for Terrain Databases," Proc. 23rd IEEE/AIAA Digital Avionics Systems Conf. (DASC), p. 4.C.2-1-4.C.2-13, Oct. 2004.

* cited by examiner

*Primary Examiner*—Phung T. Nguyen
(74) *Attorney, Agent, or Firm*—Morrison Ulman (57) ABSTRACT

A terrain database that is rendered in three-dimensional perspective on a Synthetic Vision display in a moving vehicle is updated in real-time in response to data from a ranging sensor. The updated database may be stored and shared with users of displays in other vehicles.

17 Claims, 8 Drawing Sheets

REAL-TIME, THREE-DIMENSIONAL SYNTHETIC VISION DISPLAY OF SENSOR-VALIDATED TERRAIN DATA

TECHNICAL FIELD

The invention relates generally to Synthetic Vision systems. In particular it relates to real-time updating and three-dimensional visualization of Synthetic Vision terrain data.

BACKGROUND

Consider the predicament of a helicopter pilot flying in darkness or low-visibility weather conditions. Equipped with conventional navigation systems today's pilot is forced to fly slowly and find a way through the murk.

Perhaps the helicopter has a modern global positioning system (GPS) receiver on board coupled to a "moving map" display. This system shows the position of the aircraft as a symbol on a two-dimensional electronic map. It provides the same type of situational awareness that the pilot could achieve using a paper map, although much more easily and accurately.

Conventional moving maps do not show altitude above the ground, however. Rapid progress is being made in developing maps that change color as height over the ground changes, but while these systems offer an improvement in situational awareness, they are more suited for avoiding a mountain range than for threading one's way between peaks.

Radar altimetry is an example of an active sensor for detecting height above terrain. A radar altimeter emits radio waves and times how long they take to return to the aircraft after reflecting off the ground. The time delay is converted into distance. Radar altimeters are often used as a numerical aid during a precision approach to a runway. Radar altimeters have limited range, generally point straight down, and offer only one data point for each aircraft position. Radar, lidar and other types of ranging sensors can give a pilot a reasonable "picture" of objects in his immediate vicinity. However, skill and experience are needed to interpret radar images.

A new approach to vehicle control in low visibility is being developed. The concept is to replace the view a pilot sees out his cockpit window, i.e. his conventional vision, with Synthetic Vision, a three-dimensional perspective view of the outside world rendered on artificial display. Synthetic Vision uses computer graphics to show terrain and man-made objects in the same position, orientation and perspective as they would appear if one were looking at them on a bright, clear day.

Of course, the Synthetic Vision system has to "know" where the terrain is and also where the aircraft is. For example, GPS sensors and microelectromechanical gyroscopes and accelerometers are often used to obtain the position and spatial orientation ("attitude") of an aircraft. The location of terrain and objects on the ground is stored in a database that contains latitude, longitude and altitude (e.g. height above mean sea level) information for the ground, buildings, towers, etc. Clearly the utility of a Synthetic Vision system depends critically on the accuracy and precision of its database.

One source of terrain data for Synthetic Vision is the Shuttle Radar Topography Mission (SRTM) which employed a specially modified radar system that flew onboard the Space Shuttle Endeavour during an 11-day mission in February, 2000. The mission obtained elevation data on a global scale to generate a nearly complete high-resolution digital topographic database of Earth. NASA has released version 2 of the SRTM digital topographic data (also known as the "finished" version). For regions outside the United States the new data set is sampled at 3 arc-seconds, which is 1/1200th of a degree of latitude and longitude, or about 90 meters (295 feet).

Version 2 is the result of a substantial editing effort by the National Geospatial Intelligence Agency and exhibits well-defined water bodies and coastlines and the absence of spikes and wells (single pixel errors), although some areas of missing data ('voids') are still present. Therefore, while the SRTM provides an excellent baseline it is still imperative that Synthetic Vision databases be checked for accuracy before pilots depend on them for terrain clearance.

Researcher Maqarten Uijt de Haag has disclosed a database validation system that involves comparing radar altimeter measurements, GPS altitude and a terrain database to find places where the database is inaccurate or unreliable. The altitude of the airplane is measured by GPS and the radar altitude. The difference in those two altitudes should be equal to the terrain elevation stored in the database. If the system finds a significant difference then a warning signal is sent to the pilot. This approach serves the function of monitoring the accuracy and reliability of the terrain database, but it does not update the database with the sensor measurements or morph the terrain skin shown to the pilot in real time on a Synthetic Vision display. (See, for example: M. Uijt de Haag et al., "Terrain Database Integrity Monitoring for Synthetic Vision Systems", IEEE Transactions on Aerospace and Electronic Systems, vol. 41, p. 386-406, April 2005; A. Vadlamani et al., "Improved Downward-Looking Terrain Database Integrity Monitor and Terrain Navigation," Proc. IEEE Aerospace Conf., p. 1594-1607, March 2004; and, A. Vadlamani et al., "A 3-D Spatial Integrity Monitor for Terrain Databases," Proc. 23rd IEEE/AIAA Digital Avionics Systems Conf. (DASC), p. 4.C.2-1-4.C.2-13, October 2004; all of which are incorporated herein by reference.)

Suppose that an elevation database is available for the area in which the rescue helicopter mentioned earlier is flying. In low visibility conditions a Synthetic Vision display showing a three-dimensional computer graphic depiction of nearby terrain would be very valuable. But what level of database reliability does the pilot require in order to believe that when his Synthetic Vision shows no obstacles, there really is nothing out there?

Alternatively, suppose the helicopter is equipped with radar, lidar, or generically, any kind of ranging sensor. Such a system can display images of the outside world as built up from real-time ranging measurements. Although radar systems are helpful, they have fundamental limitations. First of all, radar shows an image of what it sees at the moment, but it doesn't remember what it saw before. The radar transmitter must be pointed in the direction one wants to see. Also, radar does not see around a corner in a valley, or over a ridge. Finally, radar necessarily involves the transmission of high power electromagnetic energy which may be detected by an enemy; or worse provides a homing signal for enemy weapons.

Clearly Synthetic Vision and radar each have limitations that the other could help overcome. Unfortunately no system exists that combines the best characteristics of each technology in an intuitive presentation that any pilot can understand.

A helicopter flight in poor visibility is only an example of one scenario where Synthetic Vision is valuable. Boats, ships, hovercraft, airplanes, submarines, cars and trucks all find themselves in situations where a clear view outside, albeit a synthetic view, could spell the difference between successfully completing a mission or a disastrous collision. In each case, knowledge that the synthetic view had been validated by a ranging sensor (e.g. sonar on a submarine) would increase the confidence of the user of the display. In situations where stealth is required users might be satisfied if they knew that their synthetic database view had been recently updated by a friendly vehicle.

Reliance on static databases is a shortcoming of present Synthetic Vision systems. Synthetic Vision systems should instead treat their databases as information that changes dynamically. Visualization of the database (i.e. on a three-dimensional perspective Synthetic Vision display) should provide cues as to the reliability of the data presented.

To reach the full potential of Synthetic Vision, a system must be created that displays a Synthetic Vision database in three-dimensional perspective according to a user's attitude and position while simultaneously providing intuitive cues that help the user understand which data has been validated.

DETAILED DESCRIPTION

An advanced Synthetic Vision system is disclosed. The system provides a synthetic view of terrain and obstacles in the vicinity of a moving vehicle. The synthetic view is a computer rendering, in three-dimensional perspective, of objects in a terrain database. The database is updated in real-time in response to data obtained by a ranging sensor. The database may be stored and shared with other vehicles.

The synthetic view displays terrain around the vehicle in the same position, orientation and perspective in which it would appear on a bright, clear day (i.e. in the absence of any restrictions to vision). The synthetic view may therefore be used in darkness or low-visibility conditions to replace one's normal vision with Synthetic Vision. The location of terrain and obstacles is stored in a computer database.

As an example, a Synthetic Vision system mounted in a helicopter provides the helicopter pilot with a synthetic view of the helicopter's surroundings. A radar system in the helicopter is integrated with the Synthetic Vision system to update a terrain or obstacle database in real-time. In a different example, a Synthetic Vision system mounted in a submarine provides the helmsman with a synthetic view of the submarine's surroundings. A sonar system in the submarine is integrated with the Synthetic Vision system to update a sea floor or obstacle database in real-time.

Figure 1:
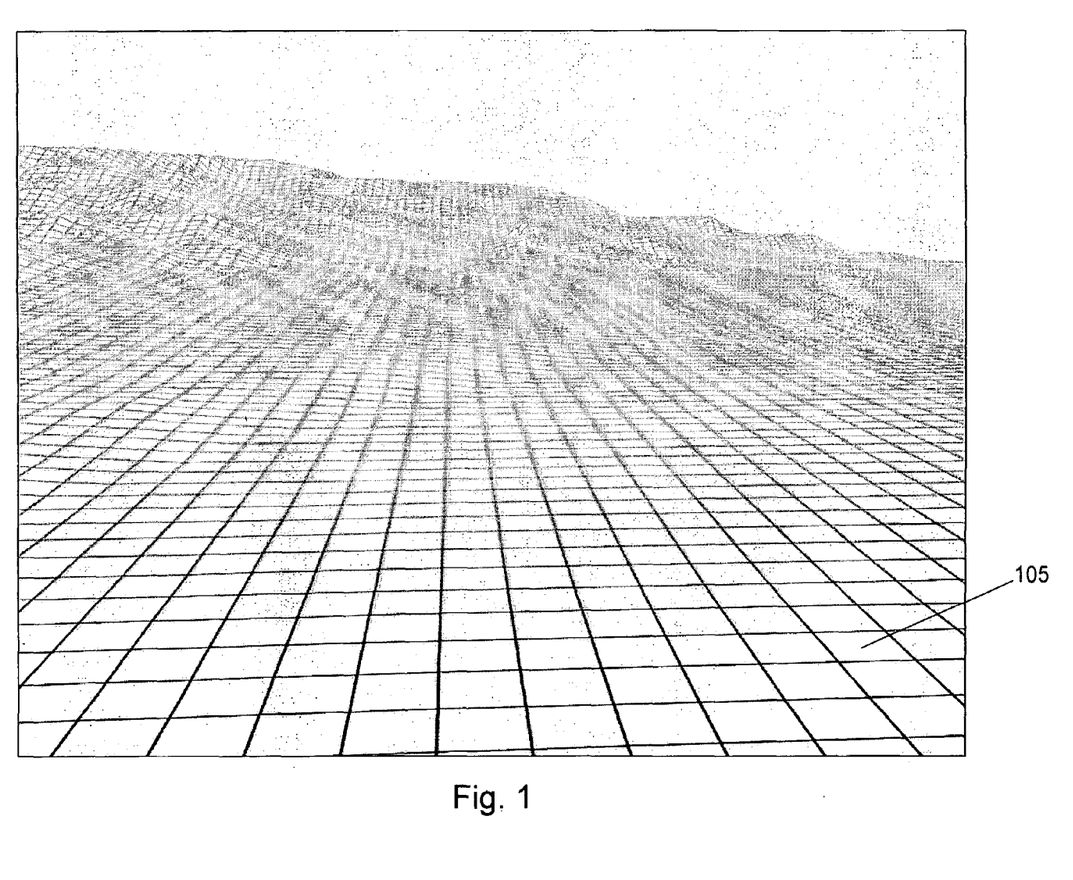
FIG. 1 shows a Synthetic Vision terrain grid displayed in three-dimensional perspective.

FIG. 1 shows a Synthetic Vision terrain grid displayed in three-dimensional perspective. The grid image 105 represents, as an example, terrain below and in front of a helicopter. The terrain in the foreground of the image is relatively flat, perhaps representing a plain or desert area, while hills appear in the distance. The terrain grid shown in FIG. 1 is a synthetic representation of the actual "out the helicopter window" view one would have of the corresponding area on earth. The image may be displayed on a graphic display in a helicopter cockpit. Despite its apparent simplicity there are several features of the displayed image that are important to note.

For discussion purposes it may be helpful to distinguish between terrain data and the display of that data in an image. The data itself is a large collection of numerical values that is stored by any one or a combination of conventional means such as dynamic random access computer memory, flash memory, magnetic recording, etc. The image on the other hand is the representation of the data in graphical form for easy human interpretation.

The data represented in the image in FIG. 1 comprises elevation information for an array of positions on Earth that are laid out in a grid. Each point in the grid, i.e. each place where grid lines cross, has latitude, longitude and altitude coordinates. It is possible to associate additional variables, such as temperature or update time, with the grid points if needed.

Although the grid illustrated in FIG. 1 is rectangular, other layouts such as triangular, hexagonal, etc., may be used with the methods disclosed herein. Irregular grids, such as triangular irregular networks, are desirable for situations where the area density of grid points to varies from place to place. A grid could have more points in areas where higher resolution sensor data is available, for example. As used in this application, "grid" means an arrangement of points; "grid" does not necessarily imply a regularly spaced array.

Real world terrain features such as peaks and valleys may occur anywhere. The grid points shown in FIG. 1 therefore are necessarily the result of interpolation of data collected at arbitrary locations between grid points. The interpolation of randomly spaced data to fit a grid results in some information loss. According to the Nyquist criterion a grid cannot represent terrain fluctuations that occur at spatial frequencies greater than the reciprocal of twice the grid spacing. On the other hand a grid is scalable. No matter how many times new terrain information is added by interpolation, the number of grid points remains constant. This property is important in practice because it keeps the problem of rendering the grid data computationally tractable.

Visual characteristics of the image in FIG. 1 contribute to making an easily viewable and interpretable display of grid data. First of all the view is a three-dimensional perspective view rather than, for example, an overhead, two-dimensional map. The perspective view is inherently intuitive to interpret. It duplicates the view that one sees with normal vision. Although not required, solid grid lines (contrasted with dashed lines, for example) contribute to making a display easy to understand. Finally it is apparent that grid lines in the foreground are rendered as sharp lines while those in the distance are blurred. This anti-aliasing is necessary because the distant lines should be represented by lines on a display that are less than one display pixel wide. Attempts to represent thin lines by duty cycle modulation of pixels results in undesirable and visually grating artifacts.

Intentional blurring on the other hand conveys the natural sensation of loss of detail in the distance.

Figure 2:
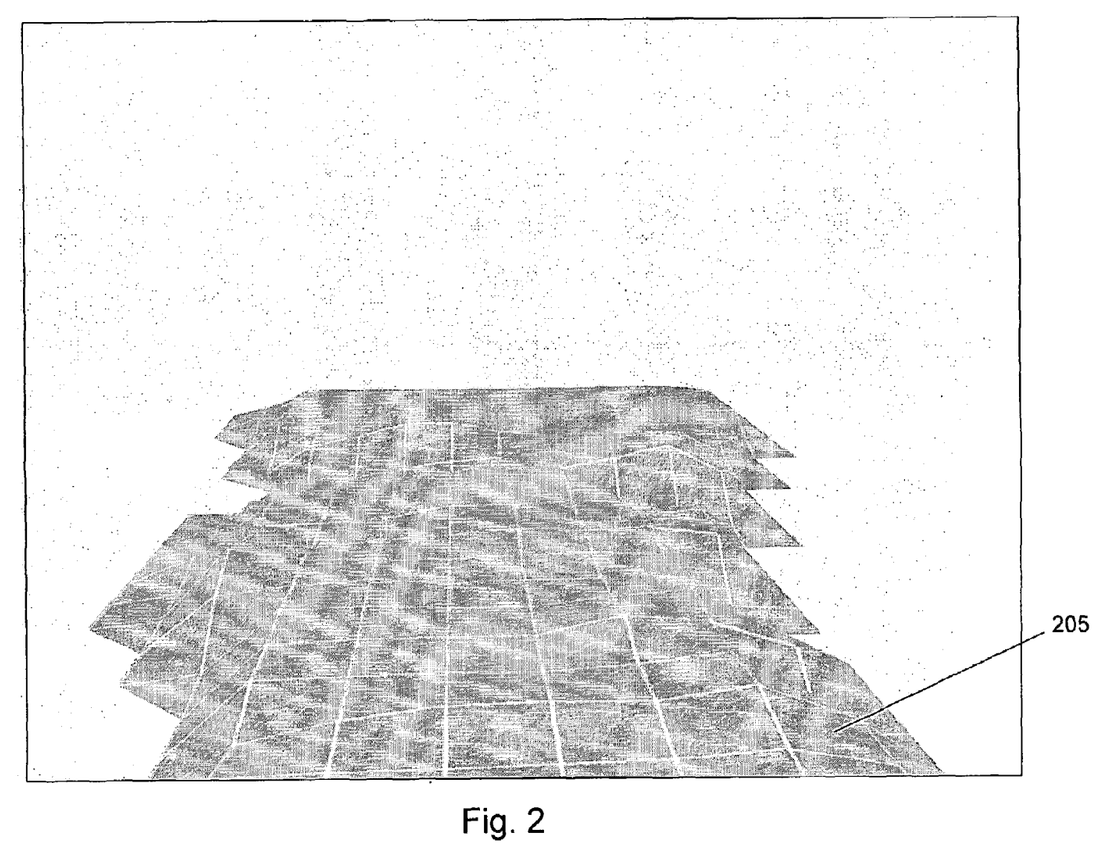
FIG. 2 shows a three-dimensional perspective image of part of a Synthetic Vision terrain grid that has been validated by sensor measurement.

FIG. 2 shows a three-dimensional perspective image of part of a Synthetic Vision terrain grid that has been validated by sensor measurement. Although the quality of terrain databases for Synthetic Vision is improving, the data is not presently reliable enough to use for close-in collision avoidance. Furthermore a database may not include changes to terrain features that have occurred after the database was created. Therefore a Synthetic Vision system must be able to validate terrain data whenever possible. Details of how sensor measurements are used to update terrain data in real time are discussed below.

In FIG. 2 terrain grid image 205 represents a section of Synthetic Vision terrain data that has been validated. Typically this means that the system has high confidence that the data represents the position of actual terrain faithfully. The data could be validated by sensor measurements such as onboard radar returns. Or it could have been validated by another vehicle and received via a data link. Or it could have been validated by people on the ground transmitting position and elevation data. "Validated" may be extended to mean simply "from a different source" or "obtained at a different time" than existing database information. It is information that the system designer wants to point out to the user.

Regardless of what the significance of validated data may be, it is brought to attention by displaying it differently from other data. One of the most effective ways to distinguish validated data is to show it in a distinctive color. Often validated data is shown in green, for example, to convey a sense of safety and security. In combination with color, brightness and texture are qualities that are effective to distinguish validate data. Validated data is more easily interpreted if it is brighter than its surroundings and if it has a texture. When color separation is not available, for example on a monochrome display, texture and brightness can still be effective visual cues. In FIG. 2, grid image 205 has a distinctive texture and is also rendered brighter (on paper brighter is represented by more ink used) than the a priori image of FIG. 1.

Figure 3:
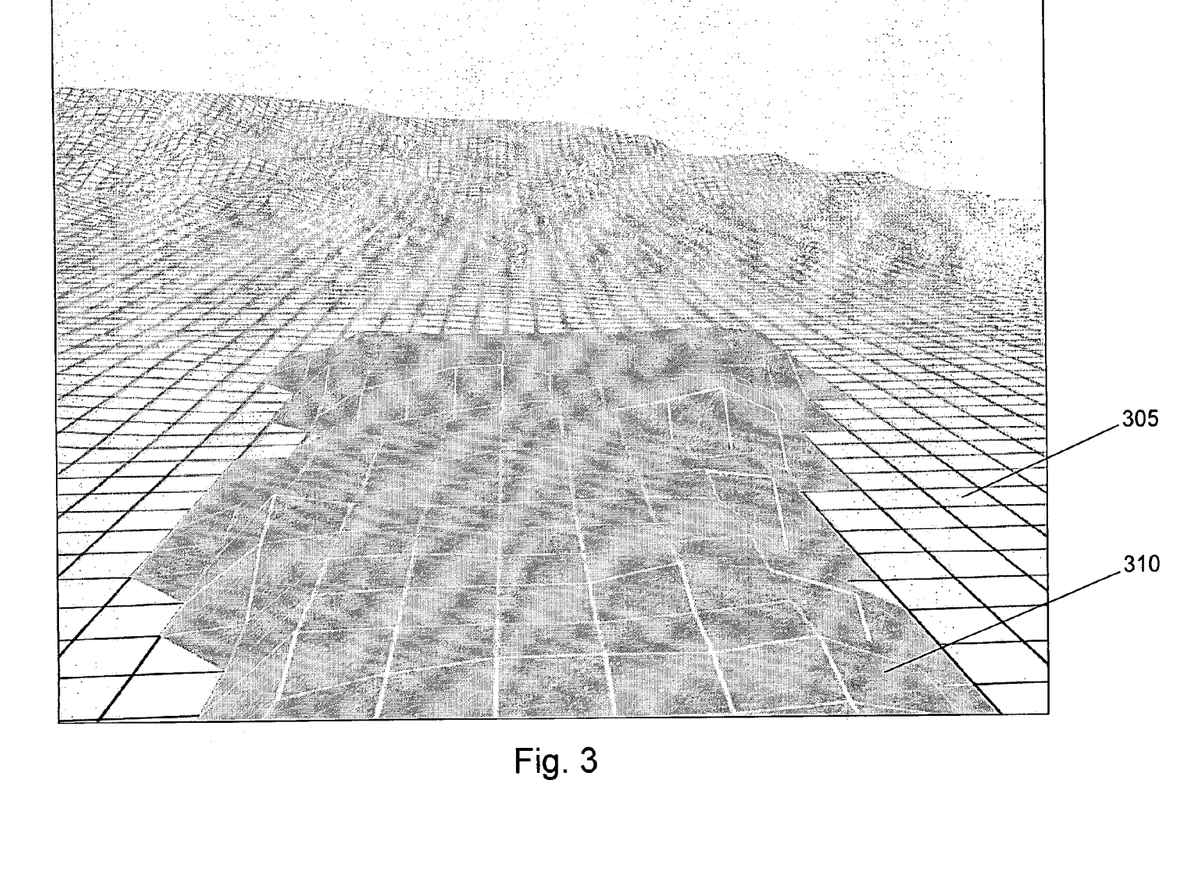
FIG. 3 shows a three-dimensional perspective image of a Synthetic Vision terrain grid, part of which has been validated by sensor measurement.

A combination of pre-existing and validated data is displayed in FIG. 3 which shows a three-dimensional perspective image of a Synthetic Vision terrain grid. In FIG. 3 part of the image has been validated by sensor measurement. The plain grid 305 represents data that has not been validated, while the textured and colored grid 310 represents validated data. It is intuitively clear that something is different about the validated area in FIG. 3 compared to the plain area, and a pilot using a display showing the image would not have to think twice or be told that he could rely on the validated areas of the scene with higher confidence than the plain areas.

In FIG. 3 the validated area 310 may show that perhaps unexpected terrain has been detected. Intuitively the significant revision to the picture provided by the validated data throws into question the reliability of the rest of the plain data. In contrast, if the elevation of the validated terrain is little changed from the previous data, then the opposite effect may occur; the plain area may be viewed with more confidence.

Another way to understand images such as FIG. 3 is that a Synthetic Vision system coupled to a database that is updated and validated in real-time effectively performs cartography on the fly. When a ranging sensor is used as a source for validation data, it can "paint" a detailed terrain map on top of old or less reliable information.

Simplicity and clarity are desirable attributes of a Synthetic Vision display and, as in FIG. 3, showing only two validation states of data, validated and not, is very effective. However, it is certainly possible to display more than two types of data. For example, a scene might comprise pre-existing terrain data, validated terrain, and warning areas. As an example, warning areas might be depicted in an alert color such as red or yellow.

Figure 4:
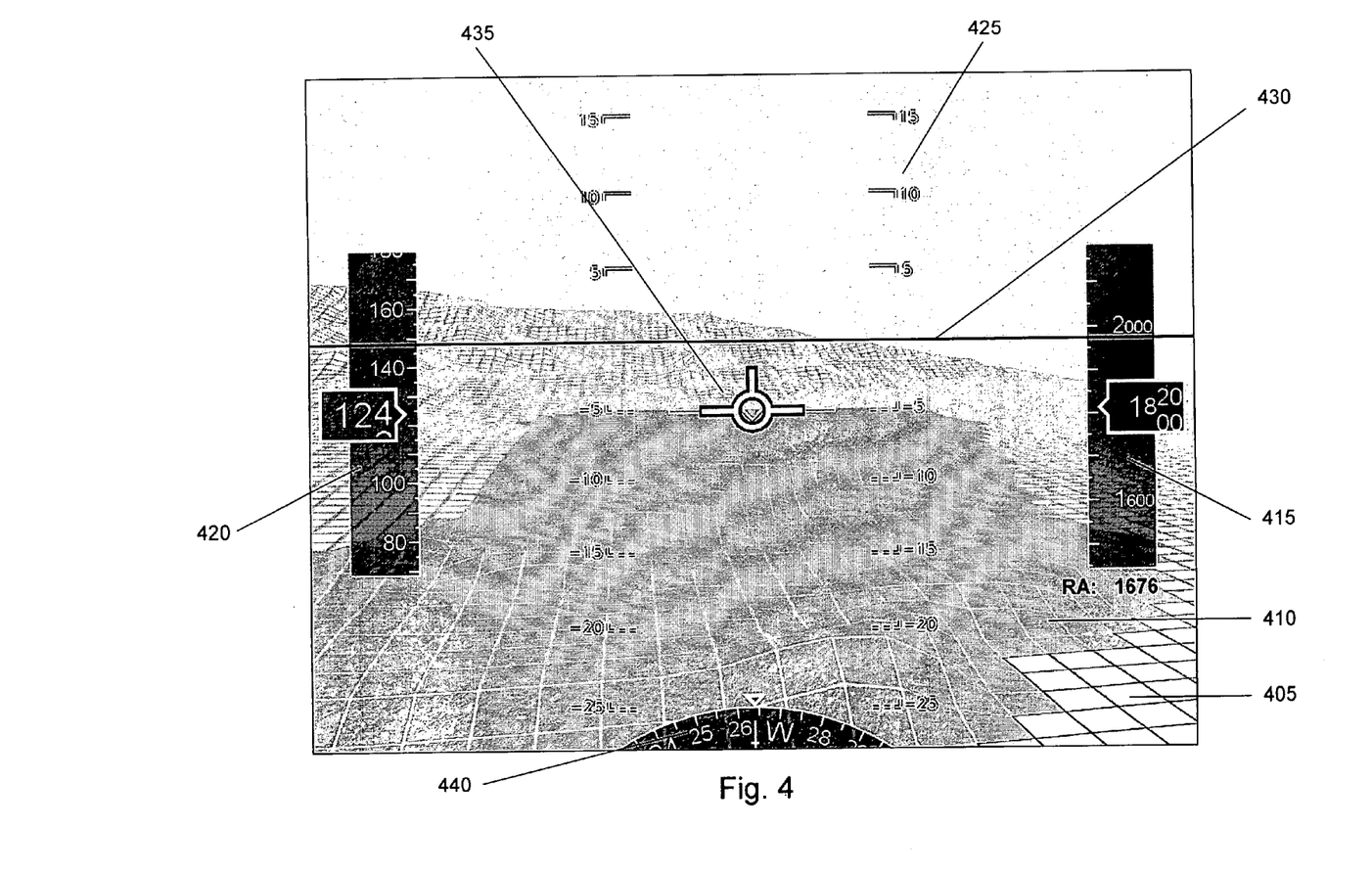
FIG. 4 shows a three-dimensional perspective image of a Synthetic Vision terrain grid (part of which has been validated by sensor measurement) with vehicle state symbology superimposed.

FIG. 4 shows a three-dimensional perspective image of a Synthetic Vision terrain grid (part of which has been validated by sensor measurement) with vehicle state symbology superimposed. In FIG. 4, 405 is an area of pre-existing terrain data, 410 is an area of validated terrain data, and symbols 415, 420, 425, 430, 435, and 440 provide, in generic terms, vehicle state data. The symbols shown in FIG. 4 are appropriate to a helicopter application.

In FIG. 4 symbol 415 is an altitude readout (with an accompanying radar altimeter readout) while symbol 420 shows airspeed. Symbol 425 is part of a pitch ladder, 430 is a horizon line, and 440 is a heading indicator. Symbol 435 represents the pitch attitude of the helicopter; in the figure it is five degrees nose down for forward flight. The combination of vehicle state symbology with the synthetic view of the outside is analogous to the view through a "head-up" display of the real outside world.

Although not shown in FIG. 4 the displayed image could be further enhanced with navigational data. For example, numerical distance to a planned fix could be displayed or more complex information such as "highway-in-the-sky" guidance could be provided.

Figure 5:
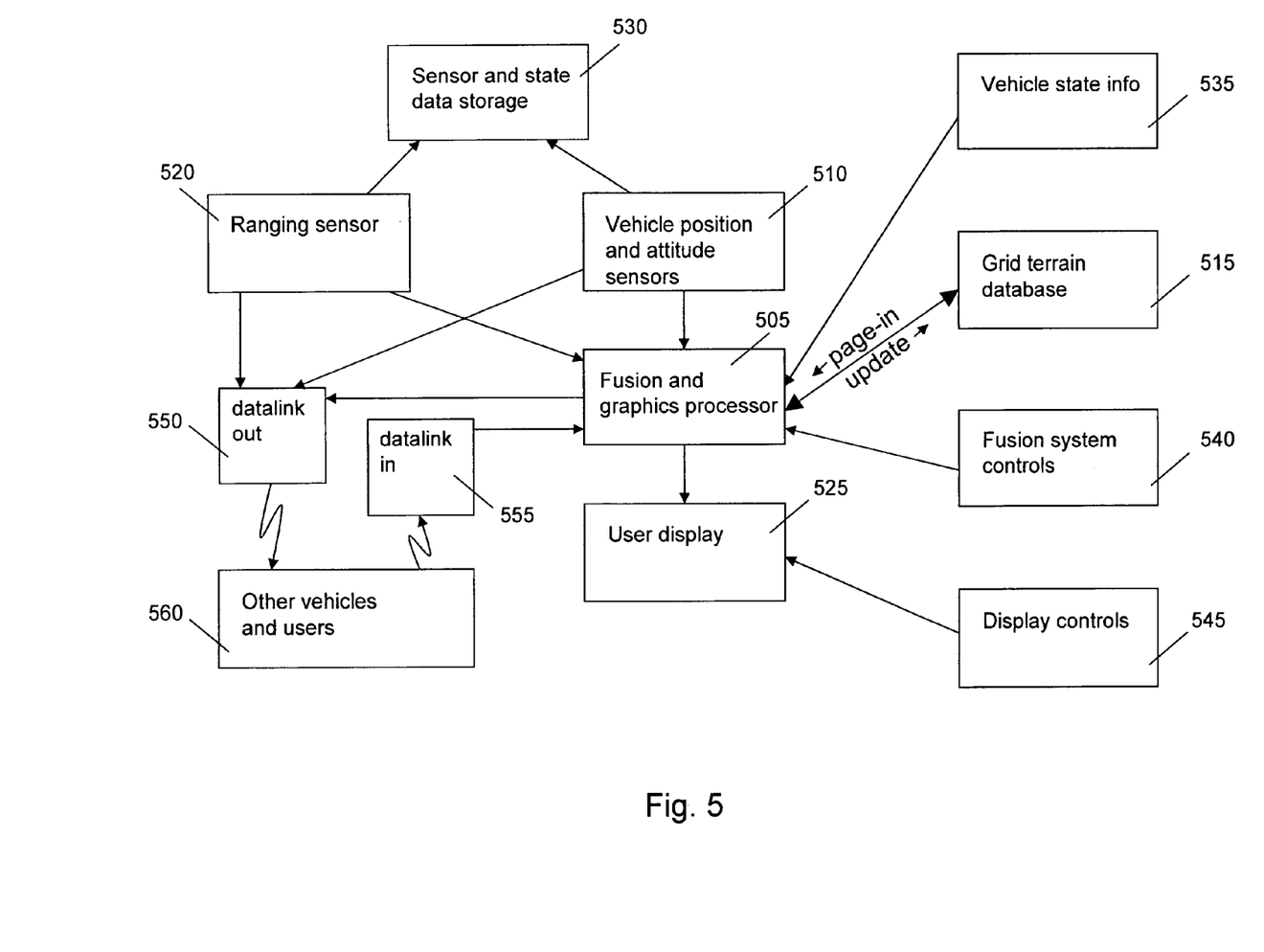
FIG. 5 is a block diagram of the components of a terrain display system.

FIG. 5 is a block diagram of the components of a terrain display system. At the center of the system is fusion and graphics processor 505. This processor combines data from vehicle position and attitude sensors 510, terrain database 515, and ranging sensor(s) 520 to create an image rendered on display 525.

In FIG. 5, item 530 is a storage unit for sensor and state data; 535 is a source of vehicle state information such as airspeed. Block 540 represents controls for the fusion and graphics processor such as controls to turn radar validation on and off, or to turn Synthetic Vision database terrain on and off. These controls may also adjust the relative brightness of synthetic and validated terrain. Display controls 545 include adjustments such as brightness and zoom. Data-links 550 and 555 transmit and receive, respectively, data to and from other vehicles and users represented in block 560.

Fusion and graphics processor ("the processor") 505 may be implemented in off-the-shelf or custom computer processing hardware. The processor performs the algorithm outlined in FIG. 6 as described below. In most cases the processor interacts with the other block components via one-directional information flow. For example, ranging sensor(s) 520, position and attitude sensors 510, vehicle state information for symbology 535 and fusion system controls 540 all send information to the processor. The processor similarly sends information to display 525.

Two-way communication is required between the processor and terrain database 515. The processor both receives terrain data from the database and sends updated data to the database as it is created. Thus the database is a dynamic entity, the contents of which are constantly changing.

Database 515 may comprise both low and high access speed memory devices. For example, it can include magnetic disk storage as well as random access memory (RAM). Information for a large region can be moved from disk to RAM as needed. The database is updated in response to information obtained by ranging sensor(s) 520.

Ranging sensor(s) 520 may include radar, lidar, sonar, or other technologies. In general however, a ranging sensor provides the range to the nearest obstacle in a particular direction (i.e. azimuth, elevation, radius). A practical ranging sensor emits a beam of finite angular width; thus the farther the beam travels the more area it encompasses perpendicular to the direction of travel. Long distance measurements cover more area than close measurements. The ranging sensor usually includes a scanning system so that an image can be built up from point measurements.

The database may also be updated by data received via datalink 555. As an example, helicopters returning from a mission may transmit recent database information to helicopters leaving to go to the same place.

Position and attitude sensors 510 provide position and orientation data to processor 505. This sensor suite may include GPS receivers, heading sensors, gyroscopes and accelerometers among other sensors. The sensor data may also be sent to outbound data-link 550 and data storage unit 530. Storage unit 530 may comprise RAM, disk or other memory devices.

Additional vehicle state information is provided to processor 505 by sensors in block 535. This information is in addition to position and attitude and may include parameters such as airspeed, radio-navigation data, temperature, etc. Control blocks 540 and 545 comprise all adjustments and inputs that a user can present to the processor and the display respectively.

Figure 6:
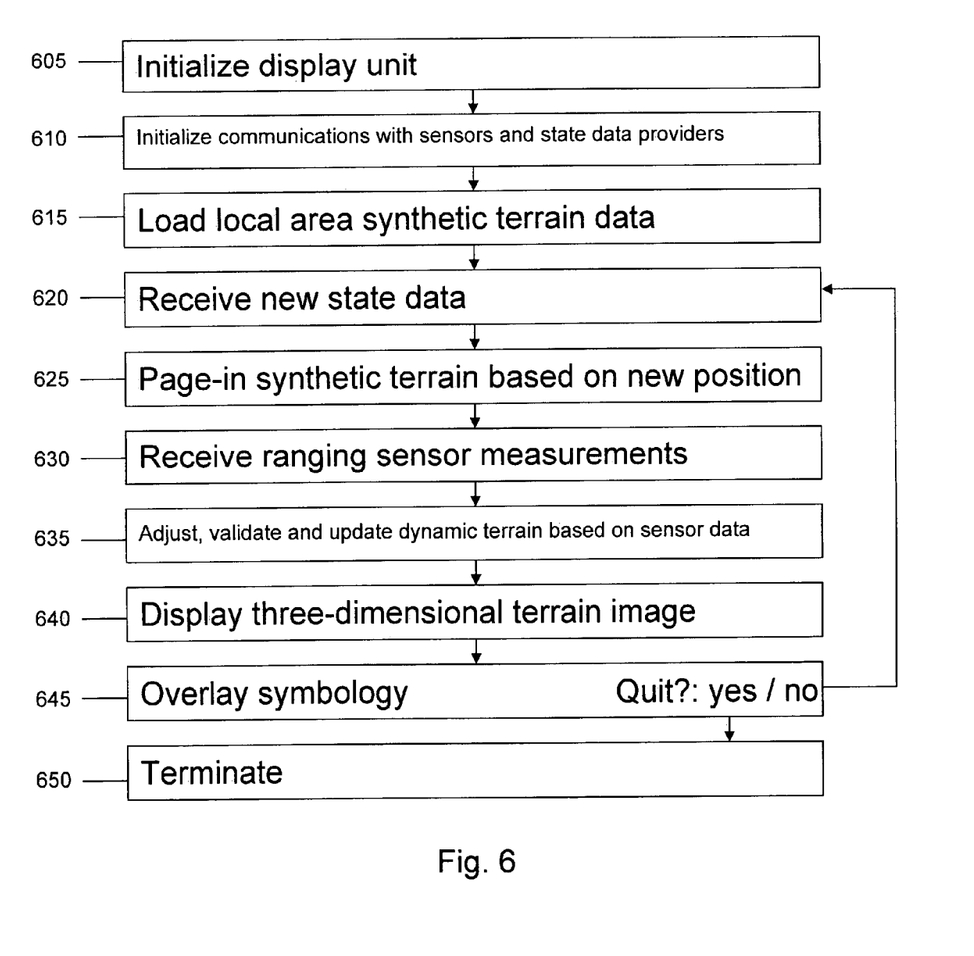
FIG. 6 is a flow chart for a terrain display system.

Although the processor performs many functions, not all of which are described here, its main job is to perform the algorithm shown in FIG. 6 which is a flow chart for a terrain fusion and display system. FIG. 6 shows steps 605-650 which the processor follows; however, these steps are not always performed in the order indicated. It is easiest to present an algorithm in loop form as shown in FIG. 6, but it may also be implemented in an interrupt-driven scheme where the loop elements are accomplished as required rather than sequentially.

In FIG. 6, step 605 is the initialization of the display unit; in step 610 communications with sensors and state data providers are initialized. Local area synthetic terrain data is loaded into the processor in step 615. In step 620 the processor receives new state data. In other words this is the step where the processor gets the latest information on position and attitude of the vehicle (e.g. a helicopter) in which the system is mounted.

Based on the latest position and attitude information appropriate synthetic terrain data for the surrounding area is loaded ("paged-in") to the processor in step 625. Attitude as well as position is needed because the perspective view of the surrounding terrain depends upon how the vehicle is oriented. This is in contrast to a simple map system where only position is necessary.

Ranging sensor measurements, for example radar information, are received by the processor in step 630. These measurements include range (i.e. distance) information and the azimuth and elevation angles that the sensor was pointing at the time of the measurement. These angles and the range are measured with respect to the vehicle. To compare these data with database data the (azimuth, elevation, range) triad must be transformed from vehicle-relative coordinates to global-relative coordinates (latitude, longitude, altitude). This process is referred to as a [III][II][I] or Yaw, Pitch, Roll coordinate transform, the principles of which are well known in the art.

In step 635 the sensor information is compared with terrain database data. In this step the processor determines which topography grid points contained in the database should be updated. The updating operation includes saving updated database information. Further details of how the sensor data is interpolated to update the elevation of grid points are provided in connection with FIGS. 7 and 8.

The updated terrain information is rendered into a computer graphic image in step 640. This operation encompasses all the graphics rendering calculations. Finally, additional symbology such as attitude and heading information is overlaid onto the image in step 645. At this point the processor checks to see if further operation is required. If it is, the process just described repeats itself starting at step 620; otherwise the processor stops in step 650.

As mentioned earlier, a regular or irregular network of grid points in a synthetic terrain view is a useful feature because it forms a scalable system. When new terrain elevation data for an arbitrary position on the ground is obtained by a ranging sensor, that data is used to adjust the height of nearby grid points. The number of grid points and their lateral locations do not change however. Therefore, no matter how much new terrain elevation data arrives, the number of computations required to display the synthetic view does not change.

Contrast this situation with a system that added a new grid point at the location of each new sensor measurement. The number of grid points would grow quickly and the computational burden would become so large that real-time processing would not be feasible.

Incoming ranging sensor data can be incorporated into a grid terrain database through interpolation with an influence function. The influence function specifies how much effect new elevation data received for an arbitrary location has on nearby grid points. The influence function may be related to the sensor's beamwidth and/or be appropriately modified to account for other system requirements, such as, for example, database grid structure and spacing.

Figure 7:
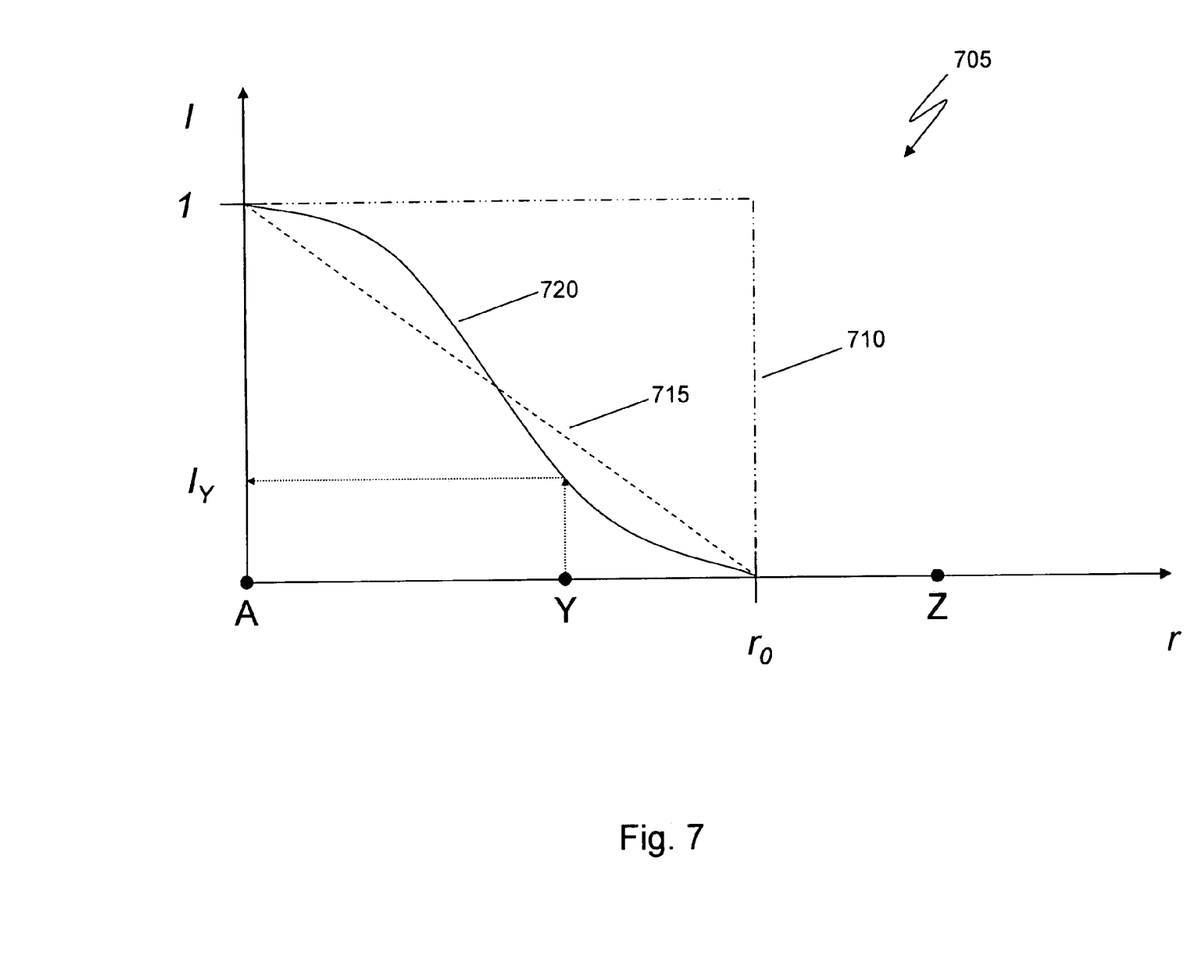
FIG. 7 shows a graph of various influence functions.

FIG. 7 shows a graph 705 of various influence functions. In the figure, influence, I, is plotted versus radius, r. Three influence functions 710, 715 and 720 are shown. On the r axis radius $r_0$ and also the radii for points Y and Z (discussed below) are marked. On the I axis, 1 (unit influence) and influence value $I_Y$ are marked. Point A, which lies at r=0 is discussed in connection with FIG. 8.

Influence functions 710, 715 and 720 share the properties: I=0 for all $r>r_0$; and, I is not defined for r<0.

Function 710 is a "top hat" function in which I=1 for $r \leq r_0$. Function 715 decreases linearly from I=1 at r=0 to I=0 at $r=r_0$. Function 720 decreases monotonically from I=1 at r=0 to I=0 at $r=r_0$. Function 720 could be a cubic approximation to a Gaussian function, for example.

Although influence functions 710, 715 and 720 decrease monotonically from r=0 to $r=r_0$ this is not a requirement for all influence functions. Similarly, although influence functions 710, 715 and 720 are equal to one at r=0 this is not a requirement for all influence functions. However all influence functions must obey the properties: I=0 for all $r>r_0$; and, I is not defined for r<0.

Figure 8:
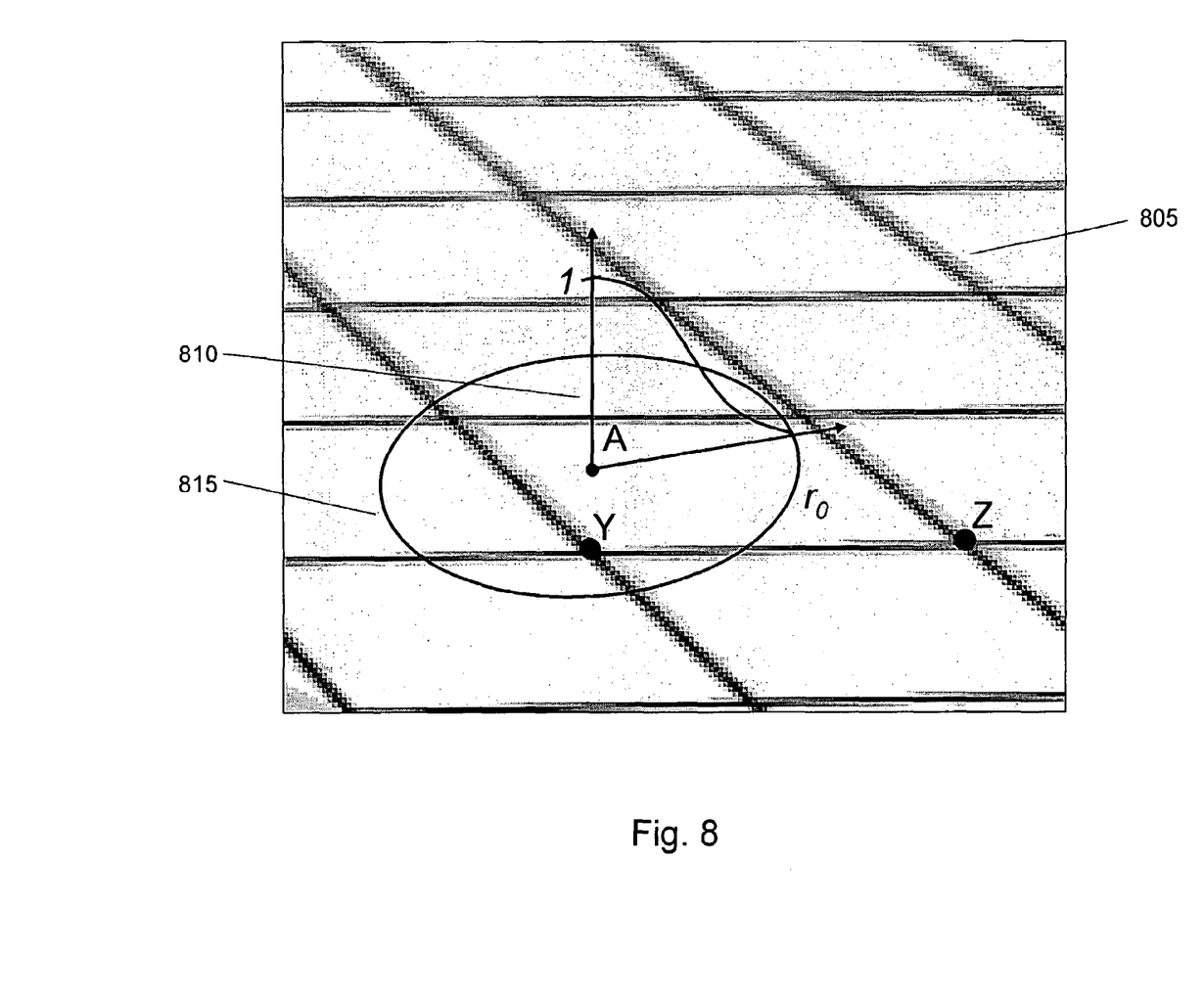
FIG. 8 is a schematic illustration of a synthetic terrain grid with a graph of an influence function superimposed for discussion.

Further understanding of the use of an influence function may be obtained by inspection of FIG. 8. FIG. 8 shows a schematic illustration of a synthetic terrain grid 805 with a graph 810 of an influence function superimposed for discussion. In the figure, terrain grid points Y and Z are labeled for clarity. Point A is a sensor data point and circle 815 represents a radius $r_0$ from it.

Suppose that a ranging sensor (e.g. 520 in FIG. 5) has reported raw data to a processor (e.g. 505 in FIG. 5) and that the processor has performed a coordinate transformation to determine that terrain exists at a certain elevation at point A. The processor must now determine how much to adjust the elevation of grid points near point A.

Point A as reported by the sensor is located in space by the processor in terms of latitude, longitude and altitude: $lat_A$, $lon_A$, $alt_{A,\ sensor}$. The processor first uses existing grid database points to calculate an altitude for point A based on prior data: $alt_{A,\ database}$. This is done by interpolating the altitudes of nearby grid points. Next the difference, $\Delta alt$, between the measured and interpolated altitudes at point A is calculated:

$$\Delta alt = alt_{A,sensor} - alt_{A,database}$$

An influence function is now used to determine how much to adjust the elevation of points that lie a distance $r_0$ or less away from point A. Consider point Y, for example. Point Y is less than $r_0$ away from A and its elevation is updated according to:

$$alt_{Y,updated} = alt_{Y,database} + \Delta alt \cdot I_Y$$

$I_Y$ is the value of the influence function (e.g. function 720 in FIG. 7) at the radius corresponding to the distance between points A and Y. $alt_{Y,\ database}$ is the altitude at point Y previously existing in the database while $alt_{Y,\ updated}$ is the updated altitude at point Y. $alt_{Y,\ updated}$ may now be stored in the database.

The process is repeated for any other grid points that lie within a distance $r_0$ from point A. After all the grid points within $r_0$ from point A have been updated, there is no longer any need for the system to remember anything about point A and all information about it ($lat_A$, $lon_A$, $alt_{A,\ sensor}$) can be discarded. In this way the system adjusts and validates dynamic terrain based on sensor data.

Physically, $r_0$ is related to the properties of the imaging sensor and level of terrain detail required. If the ranging sensor has a wide beam width then sensor measurements are derived from large areas of terrain. One simple method is to determine r0 as:

$$r_0 = (\text{sensor beam half-angle}) \cdot (\text{sensed range to terrain point})$$

$r_0$ should be prevented from being too large or else too many grid adjustment calculations will be required and the processor will not be able to keep up with the arrival of new data. Therefore $r_0$ is constrained to be less than a constant $r_{MAX}$ which is determined by graphics hardware considerations. Although $r_0$ is illustrated in FIG. 8 as being only slightly larger than the grid spacing, in general $r_0$ could be significantly greater than the grid spacing.

In most applications ranging sensor data is considered reflect the true state of the outside world. In other words it takes precedence over database information. However it is also possible to tag grid database and ranging sensor data with time information and to weight the importance of data according to time. For example, it might be appropriate to reduce the effect of ranging sensor data on very recently updated grid database data compared to its effect on older grid database data. This could be useful when one has high confidence in the database and only noisy sensor data.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A terrain display system comprising:
    a ranging sensor;
    a position and attitude sensor;
    a terrain database;
    a display; and,
    a fusion and graphics processor that
        combines data from the ranging sensor, the position and attitude sensor, and the terrain database; and,
        sends to the display a synthetic image of terrain data that represents terrain as it would appear to an observer located and oriented according to position and attitude data provided by the position and attitude sensor; wherein,
        the terrain database is updated in response to data from the ranging sensor.

2. A system as in claim 1 wherein terrain data in the terrain database comprises elevation information for an array of geographical positions that are laid out in a grid.

3. A system as in claim 2 wherein the grid comprises a regularly spaced array of data points.

4. A system as in claim 2 wherein the grid comprises an irregularly spaced array of data points.

5. A system as in claim 2 wherein the processor uses an influence function to adjust and update dynamic terrain data based on sensor data.

6. A system as in claim 5 wherein the influence function is equal to zero for all distances greater than a specified radius, $r_0$.

7. A system as in claim 5 wherein the processor updates terrain data in real time.

8. A system as in claim 7 wherein the processor overlays vehicle state symbology on the image sent to the display.

9. A system as in claim 8 further comprising a storage unit for sensor and state data, wherein the storage unit stores range data from the ranging sensor and state data from the position and attitude sensor.

10. A method for updating a terrain database comprising:
    providing a ranging sensor, a position and attitude sensor, a terrain database, and a fusion and graphics processor;
    initializing the sensors, database, and fusion and graphics processor;
    retrieving Synthetic Vision data from the database according to position and attitude data provided by the position and attitude sensor;

using real-time data from the ranging sensor to adjust and update the Synthetic Vision data; and, repeating the retrieving and using until a signal to stop is received.

11. A method as in claim 10 wherein the terrain database comprises elevation information for an array of geographical positions that are laid out in a grid.

12. A method as in claim 11 wherein an influence function is used to adjust and validate the Synthetic Vision data using real-time data from the ranging sensor.

13. A method as in claim 12 wherein the influence function is equal to zero for all distances greater than a specified radius, $r_0$.

14. A system for updating a terrain database comprising:
a ranging sensor;
a position and attitude sensor;
a terrain database;
a display; and,
a fusion and graphics processor that
combines data from the ranging sensor, the position and attitude sensor, and the terrain database;
sends to the display a synthetic image of terrain data; and,
updates the terrain database in response to data from the ranging sensor.

15. A system as in claim 14 wherein no matter how much data is combined from the ranging sensor, the position and attitude sensor, and the terrain database by the fusion and graphics processor, the number of computations performed by the processor to display the synthetic image does not change.

16. A system as in claim 14 wherein the processor uses an influence function to adjust and update dynamic terrain data based on sensor data.

17. A system as in claim 16 wherein the influence function is equal to zero for all distances greater than a specified radius, $r_0$.

* * * * *